No. 649,202. Patented May 8, 1900.
W. FELD.
APPARATUS FOR MAKING BARIUM OXID.
(Application filed Nov. 17, 1899.)
(No Model.) 2 Sheets—Sheet 1.
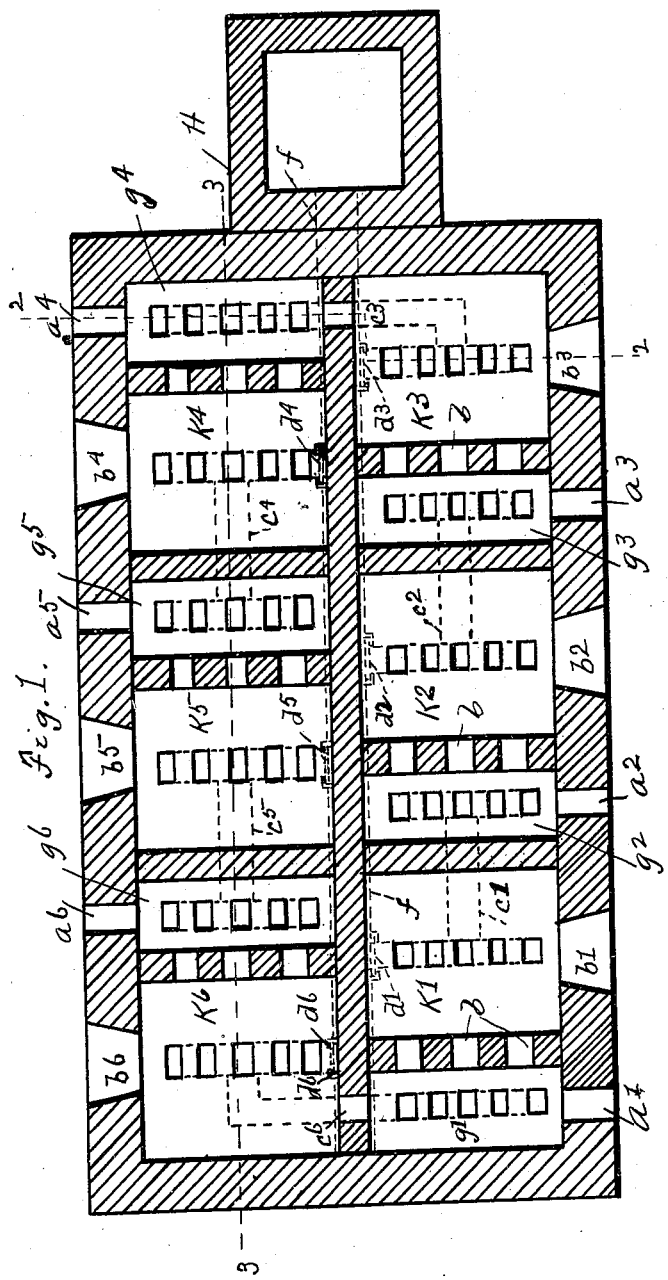
WITNESSES
D. W. Gould
A. N. Mature
INVENTOR
Walther Feld
By J. E. M. Bowen,
Attorney.

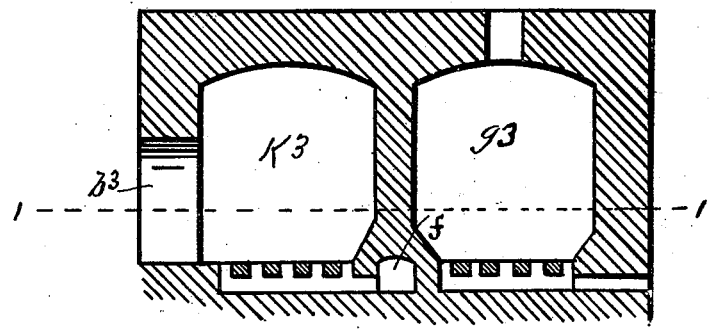
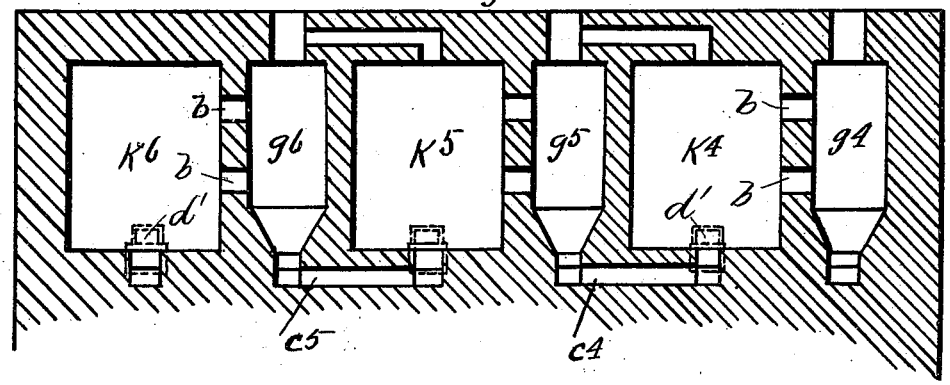

UNITED STATES PATENT OFFICE.

WALTHER FELD, OF LINTZ-ON-THE-RHINE, GERMANY.

APPARATUS FOR MAKING BARIUM OXID.

SPECIFICATION forming part of Letters Patent No. 649,202, dated May 8, 1900.

Original application filed June 28, 1897, Serial No. 642,599. Divided and this application filed November 17, 1899. Serial No. 737,342. (No model.)

*To all whom it may concern:*

Be it known that I, WALTHER FELD, a subject of the Emperor of Germany, and a resident of Lintz-on-the-Rhine, Germany, have invented certain new and useful Improvements in Apparatus for Manufacturing Barium Oxide, of which the following is a specification.

This invention relates to apparatus for manufacturing barium oxide and barium hydroxide from barium carbonate; and the invention consists in the kiln or apparatus hereinafter fully described, and specified in the claims.

It is possible to expel the carbon dioxide from calcium carbonate and strontium carbonate and to obtain a good yield of calcium oxide and strontium oxide, respectively, by heating the carbonates in kilns fired directly or with generator-gas; but barium carbonate is decomposed with difficulty this way, so that but forty to fifty per cent. of the carbonate burned can be converted into oxide. This has been explained by saying that barium carbonate parts with its carbon dioxide at a higher temperature than strontium and calcium carbonates. It is possible, however, to assign the incomplete decomposition of barium carbonate to another cause, for with old methods and apparatus the partly-decomposed lumps, consisting chiefly of barium carbonate and barium oxide, become covered with a fused coating, which prevents the penetration of heat into the interior of the mass, so that further decomposition of the barium carbonate is rendered difficult and the escape of the evolved carbon dioxide is hindered. As barium oxide, in common with oxides of other alkaline-earth metals, calcium, and strontium, is infusible, the formation of a fusible material must be due to the presence of impurities—as silica, iron oxide, alkalies, &c.—contained in the bricks or the ash of the coal. It follows that the barium carbonate to be burned must not be allowed to come into contact with materials containing or capable of yielding such substances, and thus it should not be burned in admixture with coal; but even when the parts of the kiln with which the hot barium carbonate comes in contact are not of firebrick and admixture of coal-ash with the carbonate is avoided there is still a superficial fusing or sintering of the burned barium, whereby its further decomposition is interfered with. I have found by experiments that this fusion and the consequent incomplete conversion of the barium carbonate into barium oxide are due to the formation of barium hydroxide. Like all gaseous fuel the generator-gas used for working the ring-kilns, in which the burning of barium carbonate has heretofore been carried out, contains water-vapor, which converts the barium oxide formed by the decomposition of the barium carbonate into barium hydroxide. The presence of even a small amount of barium hydroxide in a hot mixture of barium carbonate and barium oxide induces a fusion of the mass, which takes place on the outer layer, where the barium oxide has become hydroxide. As a result of the fusion of the external layer the lumps of barium carbonate bake together, so that the contents of the kiln fuse onto its bed and the passages for the generator-gas are stopped up. In my improved apparatus the heating is effected so as to exclude impurities and water-vapor. Fusion is prevented by not allowing the heated material to come into contact with the bricks which contain silica, alumina, &c., and by excluding water-vapor from the treated material while it is still undergoing decomposition. For this purpose fuel that has been dried beforehand is used, and one is chosen poor in hydrogen, such as anthracite coal or coke. The air admitted for the gasification of the fuel and the combustion of the generating-gas is also dried, which may be effected by passing the air over one of the known materials used for drying gases, such as quicklime; but the simplest way of drying the air consists in passing it over already-burned barium oxide, which has so far cooled that the small proportion of barium hydroxide formed by the moisture of the air on the barium oxide will not become fused, while the moisture is completely removed by the oxide.

Figure 1 is a sectional ground plan on line 1 1 of Fig. 2. Fig. 2 is a sectional view on line 2 2 of Fig. 1, and Fig. 3 is a similar view on line 3 3.

$K'$ $K^2$ $K^3$ $K^4$ $K^5$ $K^6$ are chambers adapted to be charged with carbonate.

$g'$ $g^2$ $g^3$ $g^4$ $g^5$ $g^6$ are generators adjoining a corresponding chamber $K'$ $K^2$, &c.

$f$ is a canal or passage by which products of combustion are carried to chimney H.

$d'$ $d^2$ $d^3$ $d^4$ $d^5$ $d^6$ are doors connecting the chambers K with the passage $f$.

$b'$ $b^2$ $b^3$ $b^4$ $b^5$ $b^6$ are openings by which the finished barium oxide is withdrawn.

$a'$ $a^2$ $a^3$ $a^4$ $a^5$ $a^6$ are openings by which the generators $g$ are charged and by which the necessary air for combustion is admitted.

$c'$ $c^2$ $c^3$ $c^4$ $c^5$ $c^6$ are channels or pipes connecting the generators.

In this kiln the carbonate is preferably introduced after having been shaped into bricks. I have found it advantageous, if using artificially-obtained carbonate, to form the bricks with a certain admixture of carbon. Fuel specially dry and poor in hydrogen should be employed.

In using this apparatus a number of the chambers K and of adjoining generators $g$ ought to be already burned out, while others are at their highest temperature and others are gradually being heated. For instance, let chamber $K^3$ be fully charged and let it, as well as the generator $g^3$, be in a state of its highest temperature. Then the chambers $K'$ and $K^2$ would be filled with products already finished and the corresponding generators $g'$ and $g^2$ would be burned out. The air is admitted at $a'$ into the generator $g'$, passes through openings 3 3 into chamber $K'$, down through the barium oxide contained in the chambers $K'$ to passage $c'$, to generator $g^2$, through passages 3 to $K^2$, and down through the contents thereof, still remaining at a comparatively-high temperature. Thus it is heated and dried and at the same time cools the barium oxide. It then enters the generators $g^3$ and acts upon the fuel contained therein, thus causing the decomposition of the carbonate contained in $K^3$. The products of combustion generated in $K^3$ pass through $K^4$ and $K^5$, thus heating and drying the fresh charges of carbonate contained in these chambers. During this time the chamber $K^6$ is charged with fresh carbonate. As soon as the temperature in chamber $K^3$ begins to decrease generators $g^4$ and $g^5$ are consecutively charged with fuel. The combustion-gases still issuing from $K^3$ effect the necessary drying of the fuel and carry off the hydrogen in it in the form of hydrocarbons. When, therefore, the decomposition commences in the chamber $K^4$, only gas free of water enters said chamber.

The exclusion of moisture should be quite perfect, since an admixture of two to five per cent. of barium hydroxide suffices to effect a superficial melting of the mass.

Suitable doors may be used for openings $b'$ $b^2$, &c.

Having thus described my invention, what I claim as new, and desire to secure by Letters Patent, is—

1. A kiln for making barium oxide and barium hydroxide consisting of a number of chambers adapted to receive the carbonate, in the shape of bricks, and an equal number of generators located each beside of corresponding decomposition-chamber and suitable channels for conducting air to the generators and waste gases from the generators, the channels for conducting air to the generators being so arranged that the air is conducted through the already-burned chambers and is heated while cooling the burned material and giving its moisture to the finished barium oxide, the channels for conducting the waste gases being so arranged that the waste gases from the heated chamber go through the newly-filled generators and chambers for drying, the combustion material and the barium carbonate for which purposes every chamber may be connected with and separated from the air conduction and the waste conduction.

2. The combination in a kiln of a series of chambers $K'$, $K^2$, &c., adapted to receive barium carbonate, a separate generator $g'$, $g^2$, &c., in proximity to each chamber, passages connecting the generators and chambers in succession so that the products of combustion in some of the chambers can pass through advance chambers for heating the contents thereof and so that air to support combustion in some of said chambers first passes through other of said chambers, whereby the material is gradually heated and whereby the air is freed of moisture before combustion.

Signed at Cologne, Germany, this 14th day of October, 1899.

WALTHER FELD.

Witnesses:
G. V. KIESCUWETTER,
CHAS. E. BARNES.